UNITED STATES PATENT OFFICE 1,988,941

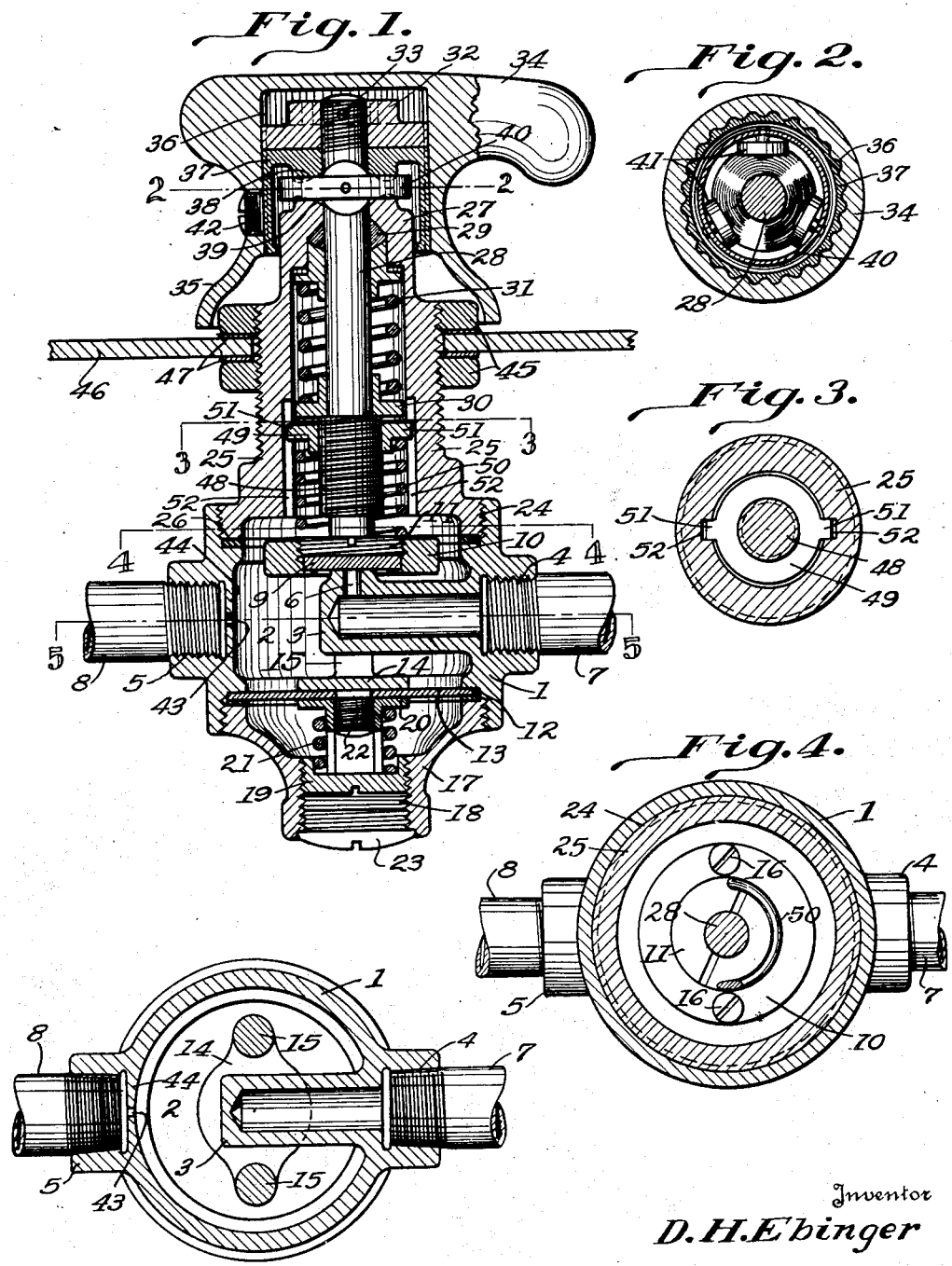

VALVE REGULATING MEANS

David H. Ebinger, Columbus, Ohio

Application June 9, 1932, Serial No. 616,282
Renewed June 20, 1934

3 Claims. (Cl. 50—23)

This invention relates to an improved regulating and control valve, and with regard to its more specific aspects, provides a valve controlled means for regulating the flow of liquid, which fluctuates with pressure, through a conduit or pipe line system.

The present invention constitutes a continuation in part of the disclosures set forth in my co-pending application Serial No. 328,093, filed December 24, 1928.

In my aforesaid application there is set forth a combined regulator and control valve all in one casing and wherein the casing is formed to include high and low pressure chambers connected by a restricted port. Between the low pressure chamber in the casing there is positioned a valve disk for controlling the port between the two chambers, and connected with this valve disk is a flexible diaphragm acted on by the liquid in the low pressure chamber to vary the opening and closing of the port in providing for a regulated stream therethrough. Arranged below the diaphragm is a compression spring which tension may be varied by adjusting means accessible from the lower end of the valve casing. This adjustment of the spring is highly essential in that the tension thereof may thus be regulated to best adapt the device to the particular water pressure to be handled. The aforesaid application also includes a manually withdrawn, self-engaging operating stem for the positive closing of the valve, which stem has no direct connection with the valve disk other than engaging the same by spring pressure.

A valve including this construction, which although quite satisfactory when the valve is exposed or located so that the adjustment thereof may be made very readily, is not quite suitable when the valve body is located interior of a structure such as the refrigerator housing or positioned such that access may not be had to the adjusting means for the diaphragm. It is therefore an object of the present invention to provide a valve with means for adjusting said diaphragm from the operating portion or manipulating handle of the valve so that said adjustment may be made without the necessity of removing the valve from its position when located within a cabinet or wall structure.

More specifically, the invention consists in the provision of a compression spring arranged above the valve disk for action thereon against liquid pressures together with an adjustable seat for one end of the spring, which seat may be adjusted to vary the tension of the spring by a threaded connection between said seat and the operating stem of the valve.

It is also an object of the present invention to provide for a more balanced and sensitive valve by the positioning of this spring above the valve disk which is opposed in action to the spring arranged in connection with the flexible diaphragm of the regulator so that the device will be very positive in its action in regulating the flow of liquid therethrough.

With these and other objects in view, which will appear as the description proceeds, the invention consists in the novel features of construction, combinations of elements and arrangements of parts hereinafter to be more fully described and pointed out in the appended claims.

In the accompanying drawing:

Figure 1 is a vertical longitudinal sectional view taken through the combined regulator and valve comprising the present invention, Figure 2 is a horizontal sectional view taken on the line 2—2 of Figure 1, Figure 3 is a similar view taken on the line 3—3 of Figure 1, Figure 4 is also a similar view taken on the line 4—4 of Figure 1.

Figure 5 is also a horizontal sectional view taken on the line 5—5 of Figure 1.

Referring more particularly to the drawing, the numeral 1 designates the central casing of the improved valve structure constituting the present invention. This casing, which is generally of cylindrical form, is formed internally to include a chamber 2 and located within this chamber is a double partition member 3 located between the inlet and the outlet 4 and 5 respectively. This partition member, which is closed at its inner end, has its upper wall provided with a restricted port or outlet jet 6 located in the longitudinal axis of the valve. Threaded into the inlets and outlets are the ends of the conduits 7 and 8 which may be part of a pipe line system or its equivalent therein.

The water enters the conduit 7 from the water supply line through the jet 6 which is utilized to discharge the water into the chamber 2 of the casing and is normally closed by a disk or washer 9. This disk is carried by a circular head 10 and held in place thereon by a threaded plug 11. The head 10 is adapted to move longitudinally of the casing 1 so that the disk 9 may be moved toward or away from the jet 6 for the purpose of regulating the outflow of liquid from the double partition or conduit member 3.

The lower end of the casing 1 is provided with a large threaded opening which terminates in an annular seat 12. Upon this seat there is positioned the outer peripheral edge portion of a flexible diaphragm 13. Secured to the inner wall of this diaphragm and disposed within the chamber 2 is a stirrup or yoke 14, the latter being formed with a pair of integral longitudinally extending arms 15 sufficiently spaced so that the conduit member 3 projects between them, as shown in Figure 5 of the drawing. The upper ends of these arms engage with the head 10 and in this instance the head 10 and the arms 15 are provided with registering openings adapted to receive threaded fastening screws 16, which serve to unite for uniform movement the diaphragm 13 and the head 10.

The diaphragm 13 is retained in place by means of a closure 17 which is threaded into the open lower end of the casing 1 in which the diaphragm 13 is positioned. The closure 17 serves to grip frictionally the peripheral portion of the diaphragm so as to hold the same securely around the circumferential edges of the casing. Further, the closure 17 has its outer or lowermost portion formed with an internally located threaded bore 18, in which is positioned an adjustable nut 19. Confined between the inner surface of this nut and a metallic annulus 20 is a coil spring 21, the normal tendency of which is to flex the diaphragm 13 inwardly so that the head 10 will be moved to open the jet 6. The annulus 20 is carried by a threaded stud 22 which projects through an opening in the central portion of the diaphragm and which is integrally formed and carried by the stirrup 14. The bore 20 is closed by a removable cap 23 which conceals the nut 19 and must be removed before said nut is rendered accessible. By adjusting the nut 19 the tension of the spring 21 may be regulated to best adapt the device to the particular water pressures to be handled.

The upper end of the casing 1 or the end opposite to the closure 17 is also provided with a threaded bore 24 adapted for the reception of a valve stem housing 25 which is seated upon a sealing gasket 26 to form a fluid-tight joint between the casing and the valve stem housing 25. The outer end of this housing terminates in a hub 27 provided with a central opening adapted for the slidable reception of the valve stem 28. The stem 28 is received within a packing gland 29 which is arranged within the housing 25. Carried by the stem 28 is a collar 30 between which and the packing gland nut is positioned a coil spring 31 of substantially greater strength than the spring 21 positioned in the lower end of the valve body. The spring 31 serves to retain the nut of the packing gland in place and to maintain the stem 28 in engagement with the head 10 to keep the disk 9 in sealed engagement with the end of the jet 6 to arrest the water flow through the valve structure.

In order to withdraw the lower end of the stem 28 from engagement with the head 10, the outer end of the stem 28 is provided with a nut 32 which is held in non-rotatable relation with the stem 28 by a key or pin 33. Rotatable on the upper end of the stem 28 is an operating knob or handle 34 which includes a bell shaped inner portion 35 arranged around the outer end of the hub 27. The knob or handle 34 is formed with a non-circular bore 36 for the reception of the similarly shaped side surfaces of the nut 32 and a substantially cup-shaped member 37 so that upon the rotation of the knob 34 the nut 32 with its attached stem 28 and the member 37 will rotate in unison therewith. The member 37 has its interior provided with a cam surface 38 arranged in complemental relationship with a corresponding surface 39 formed with the upper end of the hub 27. Loosely positioned between these surfaces is a frame 40 carrying rollers 41 rotatable about independent axes. The rollers 41 rest in the low portions of the cam surfaces of the hub 27 and the member 40, when the latter is turned by the action of the knob, the cams thereon climb upon the rollers causing them to rotate and in turn roll up the cams on the hub, imparting a raising movement to the stem 28. The ring carrying the rollers is confined within the bell shaped inner portion or extension 35 formed with the knob or handle member 34. The handle or knob 34 is held in place for rotation with the member 37 by a set screw or the like 42. By the removal or loosening thereof, the handle 34 may be lifted free from the valve assembly exposing the nut 32, the purpose of which will appear later.

In the operation of the structure just described, which is substantially that as set forth in the co-pending application mentioned before, the knob 34 is rotated which results in causing the rollers 41 to move into engagement with the cam surfaces 38 and 39, thereby longitudinally shifting the stem 28 so that the lower end thereof is moved away from the top surface of the head 10 which will be retained in this position as long as the knob 34 is held in its rotative arrangement by the manual operation. This will compress the spring 31 which will return the stem to its normal position upon the release of the knob. In moving the lower end of the stem 28 away from the head 10 by the operation described, the water pressure in the conduit 3 raises the head 10 so that the jet 6 will be uncovered. This allows the water to flow from the conduit 3 by way of the jet 6 into a chamber 2, where it issues from the casing by way of a restricted port 43 formed in the wall 44 provided in the side of the casing 1. After the water has passed through the port 43 the same may be conveyed through the pipe 8 to a drinking fountain, bubbler or other apparatus (not shown).

It should be noted that when the head 10 is moved by water pressure away from the jet 6, the extent of movement depends upon the amount of water passing through the valve. For example, if the water pressure falls below a certain mean pressure, the reduced water pressure exerted on the diaphragm 13 by the water within the chamber 2, permits the spring 21 to expand to substantially its maximum extent so that the head 10 will be moving away from the jet 6 with the fullest extent of movement allowed the same. Conversely, when the water pressure exceeds the normal pressure, the diaphragm 13 is forced outwardly to a greater extent by the water pressure within the chamber 2 and consequently the spring 21 does not function to permit of any extended movement on the part of the head 10. Thus there is automatically maintained within the chamber 2 under all conditions of pressure, a constant volume of water which permits the water to issue from the valve at a uniform rate through the entire range of fluctuating pressures. When the knob 34 is released, the stronger spring 31 operates to restore the stem to its normal position into engagement with the head 10 so that the latter is forced into a position closing the jet 6 independently of the water pressure and the action of the opposed weaker spring 21, thus automatically closing the valve.

With a valve constructed as aforesaid the adjustment of the spring 21 may be made very readily when the valve is openly positioned so that access may be had thereto. However, in many installations it is desired to position the valve body within a cabinet structure or the like such as water coolers, and wherein the operating end of the valve is the only part exposed to the exterior. In this case, in order to effect the adjustment of the valve and the diaphragm, it would be necessary to remove the valve or to provide a cabinet with a removable wall portion so that access may be had to the valve for the adjusting thereof. In order to effect this installation of the valve and to provide for the adjustment thereof, the valve body in this instance has its center casing 1 thereof slightly elongated over the form of valve set forth in the co-pending application and provided with threads on the exterior thereof with which a pair of clamping nuts 45 engage for frictionally holding a panel 46 therebetween which may be the top or side wall of a water cooling unit or other apparatus of like nature. The threads, which extend over the greater part of the upper casing 1, permit the valve body to be adjusted vertically within the opening formed in the panel 46 to align the same with the conduits 7 and 8 to best advantage. Further, the threads and the clamping nuts 45 will accommodate wall panels of various thicknesses. Gaskets 47 may be interposed between the lock nuts 45 so that an air-tight joint may be secured between the valve and the panel member to exclude atmospheric air from entering the cabinet. It will be noted that due to the bellshaped extension 35 of the handle or knob 34, the upper of the clamping nuts 45 and the threaded portion of the valve stem casing engaging therewith will be hidden from view, thus adding to the appearance of the valve, the bell shaped extension being of such cross-sectional diameter as to clear the nut 45 and not interfere with its applied position relative to the panel member 46.

To provide for the convenient adjustment of this improved valve the lower portion of the valve stem 28 is slightly enlarged and provided with threads 48 received within a nut or annulus 49 between which and the upper surface of the head 10 is positioned a coil spring 50 which may be of substantially the same strength as the spring 21 positioned below the diaphragm 13 and which acts in opposition to the latter. The annulus 49 is provided with a pair of laterally disposed ears 51 which are received for sliding movement within elongated recesses 52 formed in the valve stem housing 25. The recesses 52 serve as a guide for the annulus 49 and prevent rotation thereof when the valve is manually operated. It will be seen that by the provision of the thread 48 and the annulus 49 the spring 50 may be adjusted in its effective length by the rotation of the valve stem 28 which rotation may be made by the removal of the knob 34. This will expose the nut 32 and, as the same is keyed rigidly to the stem 28, will, upon the turning thereof by a suitable tool, also effect the rotation of the stem 28 and the longitudinal shifting of the threaded annulus 49 and consequently regulate the tension of the spring 50. The upper end of the stem 28 may for further convenience be formed with a slot in which a screw driver or the like may be inserted for the turning of the valve stem 28. By the provision of the spring 50 the adjustment of the diaphragm may be effected, due to its inner connection with the stirrup 14 in substantially the same manner as that provided by the spring 21 at the lower end of the valve casing. It will be seen that as the valve is opened, the spring seat or the annulus 49 is moved with the stem away from the head 10 and the spring is allowed to expand losing a portion of its tension which, however, is figured in when making the adjustment. The spring 50 is also, of course, much weaker than the spring 31 and will be readily compressed to an inactive position when the valve stem 28 is returned to its normal position by the stronger spring 31. By the opposed springs 50 and 21 a balanced valve structure is obtained which is highly sensitive in its action to the fluctuating pressures and will therefore respond more quickly than a valve construction employing a single spring in connection with the regulator thereof.

While I have described what I consider to be the preferred form of the invention, nevertheless it will be understood by those skilled in the art that various changes may be made therein from time to time without departing from the spirit and scope thereof as said invention has been set forth in the following claims.

What is claimed is:

1. In a valve structure, a casing formed to include spaced water inlet and outlet chambers, said chambers being in communication by a restricted port, a disk member normally closing said port, a diaphragm mounted in said casing and directly connected with said disk member, spring-pressed means engaging with said disk member and serving to maintain the latter normally in seated engagement with said port, manually operated devices cooperative with said spring-pressed means for removing the latter from engagement with said disk member, a second spring positioned between said disk member and said manually operated device, and means formed with said manually operated device for adjusting the tension of said latter spring.

2. In a valve structure, a casing formed to include spaced inlet and outlet chambers and having a restricted port, a divisional wall separating said chambers to admit of the passage of water from the inlet to the outlet chambers, a valve member movably mounted within one of said chambers, spring-pressed means cooperative with said valve member and normally serving to maintain the latter in a port closing position against water pressures in the inlet chamber, a manually operated device including a stem for removing said spring pressed means from engagement with said valve member to permit the latter to open said port, a diaphragm disposed between said casing and directly connected with said valve member, said diaphragm being responsive to the pressure of liquids passing through said outlet chambers to automatically control the extent of port opening movement of said valve member, a spring positioned between said valve member and said stem, and threaded adjusting means arranged between said spring and stem and effected upon the rotation of the latter to vary the tension of said spring, said adjustment being effected from the operating end of said valve.

3. In a valve structure, a casing formed to include spaced inlet and outlet chambers, and having a restricted port in a divisional wall separating said chambers to admit of the passage of water from the inlet to the outlet chamber, a valve member movably mounted within one of said chambers, spring-pressed means cooperative with said valve member and normally serving to maintain the latter in a port closing position against water pressures in the inlet chamber, manually operated device including a stem for removing said spring-pressed means from engagement with said valve member to permit the latter to open said port, a diaphragm arranged in said casing and directly connected to said valve member, a spring arranged between the lower portion of said stem and said valve member, a spring seat having a threaded engagement with said valve stem, said spring seat having slidable but non-rotatable connection with said casing, and means formed at the outer operating end of said stem for effecting the rotation of the latter and the shiftable adjustment of said spring seat.

DAVID H. EBINGER.